(12) United States Patent
Daher et al.

(10) Patent No.: US 10,579,653 B2
(45) Date of Patent: Mar. 3, 2020

(54) APPARATUS, METHOD, AND COMPUTER-READABLE MEDIUM FOR RECOGNITION OF A DIGITAL DOCUMENT

(71) Applicant: LEAD TECHNOLOGIES, INC., Charlotte, NC (US)

(72) Inventors: Moe Daher, Charlotte, NC (US); Waseem Shadid, Charlotte, NC (US); Kousay Alani, Charlotte, NC (US)

(73) Assignee: LEAD TECHNOLOGIES, INC., Charlotte, NC (US)

( * ) Notice: Subject to any disclaimer, the term of this patent is extended or adjusted under 35 U.S.C. 154(b) by 0 days.

(21) Appl. No.: 16/399,434

(22) Filed: Apr. 30, 2019

(65) Prior Publication Data

US 2019/0258656 A1  Aug. 22, 2019

Related U.S. Application Data

(63) Continuation of application No. 15/684,294, filed on Aug. 23, 2017, now Pat. No. 10,318,563.

(51) Int. Cl.
| | |
|---|---|
| *G06K 9/00* | (2006.01) |
| *G06F 16/332* | (2019.01) |
| *G06F 16/93* | (2019.01) |
| *G06F 16/33* | (2019.01) |
| *G06F 16/38* | (2019.01) |
| *H04N 1/00* | (2006.01) |

(52) U.S. Cl.
CPC ...... *G06F 16/3326* (2019.01); *G06F 16/3334* (2019.01); *G06F 16/38* (2019.01); *G06F 16/93* (2019.01); *H04N 1/00039* (2013.01)

(58) Field of Classification Search
CPC combination set(s) only.
See application file for complete search history.

(56) References Cited

U.S. PATENT DOCUMENTS 5,841,905 A   11/1998  Lee
6,201,894 B1   3/2001  Saito
(Continued)

OTHER PUBLICATIONS

"Perceptive Intelligent Capture", Lexmark, https://www.lexmark.com/content/dam/lexmark/documents/brochures/y2015/WW_product-summary-pic_brochure_en-US.pdf, 2015, 2 pages.

*Primary Examiner* — Alex Kok S Liew
(74) *Attorney, Agent, or Firm* — Oblon, McClelland, Maier & Neustadt, L.L.P.

(57) ABSTRACT

Described herein are an apparatus, method, and computer-readable medium. The apparatus including processing circuitry configured to extract a textual content included within a digital document, perform a text search using the extracted textual content on an indexed master document database to identify one or more master documents that are similar, within a pre-determined threshold, to the digital document, generate a candidate master document list using the one or more master documents identified based on the text search, extract a plurality of features of the digital document, perform a comparison, after performing the text search, of the plurality of features of the digital document with features of the one or more master documents in the candidate master document, and identify a master document of the one or more master documents that matches the digital document based on the comparison of the features.

18 Claims, 12 Drawing Sheets

(56) References Cited

U.S. PATENT DOCUMENTS

| | | | |
|---|---|---|---|
| 6,400,845 B1 * | 6/2002 | Volino | G06K 9/2054 358/462 |
| 8,750,624 B2 | 6/2014 | Kletter | |
| 2004/0186827 A1 | 9/2004 | Anick et al. | |
| 2005/0147299 A1 * | 7/2005 | Wang | G06F 3/03545 382/181 |
| 2008/0219543 A1 | 9/2008 | Csulits et al. | |
| 2008/0260260 A1 * | 10/2008 | Yamamoto | G06K 9/46 382/209 |
| 2011/0069893 A1 | 3/2011 | Metayer | |
| 2014/0101162 A1 * | 4/2014 | Hsueh | G06F 16/313 707/739 |

* cited by examiner

FIG. 5A

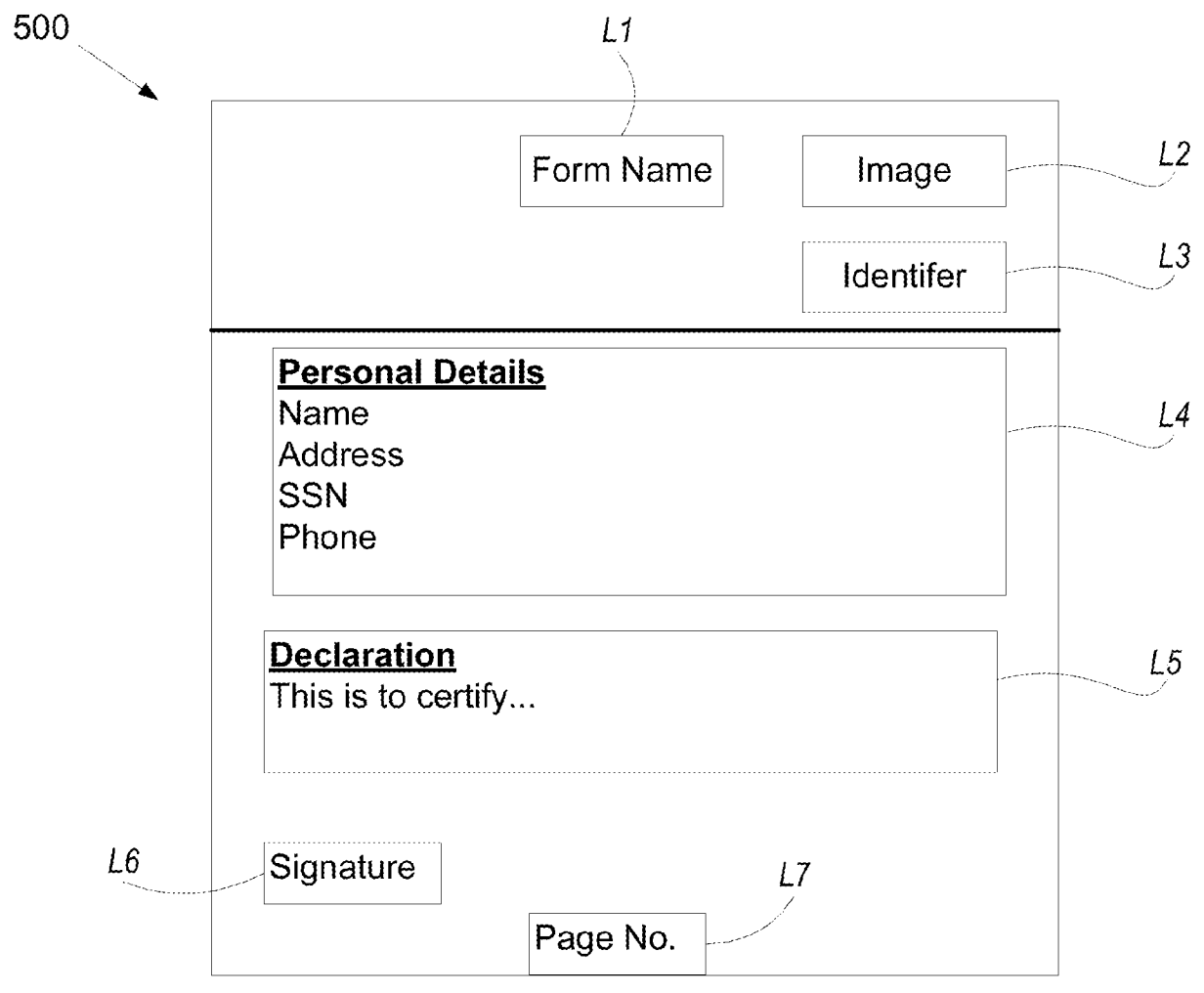

- L1 → Form Name
- L2 → Image
- L3 → Identifer
- L4 → Personal Details
  Name
  Address
  SSN
  Phone
- L5 → Declaration
  This is to certify...
- L6 → Signature
- L7 → Page No.

500

500B

| Application Data Sheet 37 CFR 1.76 | Attorney Docket Number | 5001US |
| --- | --- | --- |
| | Application Number | |
| Title of Invention | Test Form Recognition Device | |

The application data sheet is part of the provisional or nonprovisional application for which it is being submitted. The following form contains the bibliographic data arranged in a format specified by the United States Patent and Trademark Office as outlined in 37 CFR 1.76. This document may be completed electronically and submitted to the Office in electronic format using the Electronic Filing System (EFS) or the document may be printed and included in a paper filed application.

Secrecy Order 37 CFR 5.2

☐ Portions or all of the application associated with this Application Data Sheet may fall under a Secrecy Order pursuant to 37 CFR 5.2 (Paper filers only. Applications that fall under Secrecy Order may not be filed electronically.)

Inventor Information:

Inventor 1
Legal Name

| Prefix | Given Name | Middle Name | Family Name | Suffix |
| --- | --- | --- | --- | --- |
| Mr | John | | Doe | |

| Residence Information | | | | |
| --- | --- | --- | --- | --- |
| City | Charlotte | State/Province NC | Country of Residence | USA |

Mailing Address of Inventor:

| Address 1 | 100 S Base Street |
| --- | --- |
| Address 2 | |
| City | Charlotte | State/Province | | NC |
| Postal Code | 28000 | Country | | |

Correspondence Information:

Enter either Customer Number or complete the Correspondence Information section below.
For further information see 37 CFR 1.33(a).

☐ An Address is being provided for the correspondence Information of this application.

| Customer Number | 22000 |
| --- | --- |
| Email Address | johndoe@sootech.com |

Application Information:

| Title of the Invention | Test Form Recognition Device | |
| --- | --- | --- |
| Attorney Docket Number | 5001US | Small Entity Status Claimed ☐ |
| Application Type | Nonprovisional | |
| Subject Matter | Utility | |
| Total Number of Drawing Sheets (if any) | 10 | Suggested Figure for Publication (if any) |

Page 1

APPARATUS, METHOD, AND COMPUTER-READABLE MEDIUM FOR RECOGNITION OF A DIGITAL DOCUMENT

CROSS-REFERENCE TO RELATED APPLICATIONS

This application is a continuation of U.S. Ser. No. 15/684,294 filed Aug. 23, 2017, the entire content of which is incorporated herein by reference.

BACKGROUND

Field of the Disclosure

This application relates generally to improvements in a system for automatically identifying a document type. More particularly, this application relates to improvements related to comparing and identifying a digital form and/or a digital document.

Description of the Related Art

Today, documents and forms (e.g., W2 or other tax forms and documents, patent filing and examination related forms and documents, immigration related forms and documents, etc.) are acquired in digital form and distributed or processed for various purposes. Such digital documents can be emailed and stored in a database. The digital documents can contain user inputs such as personal information, a signature, a photo, etc. Often times, the user inputs may be extracted for verification purposes, data processing, automatic data filling, etc. However, before extracting the user inputs, the type of document or form under consideration must first be identified.

To enable form identification and automatic data extraction from the digital documents, a computer or circuitry is configured to perform a form recognition process. However, form recognition is not a trivial process. There can be more than a million different types of forms and documents, each having a different format, structure, or layout and containing different user inputs. As such, comparing and identifying a digital document with millions of standard or known documents (also referred to as master documents) can be time consuming for a computer, processor, etc., let alone doing it manually.

A typical form recognition process includes searching each and every form stored in a database and comparing the stored forms with the digital document under consideration. Typically, one or more features such as an image, a form structure, etc. are extracted and compared with the stored forms. However, such a form recognition process is slow, may return a large number of matches (e.g., more than 100), and may not be accurate. As such, a user may have to manually browse through a large number of forms to identify the type of form being evaluated. Thus, a form recognition process having high accuracy and quick searching capability is required to save time, manual effort, and cost.

SUMMARY

According to an embodiment of the present disclosure, there is provided an apparatus. The apparatus includes processing circuitry configured to extract a textual content included within a digital document, perform a text search using the extracted textual content on an indexed master document database to identify one or more master documents that are similar, within a pre-determined threshold, to the digital document, generate a candidate master document list using the one or more master documents identified based on the text search, extract a plurality of features of the digital document, perform a comparison, after performing the text search, of the plurality of features of the digital document with features of the one or more master documents in the candidate master document, and identify a master document of the one or more master documents that matches the digital document based on the comparison of the features.

Further, according to an embodiment of the present disclosure, there is provided a method including extracting, via processing circuitry, a textual content included within a digital document, performing, via the processing circuitry, a text search using the extracted textual content on an indexed master document database to identify one or more master documents that are similar, within a pre-determined threshold, to the digital document, generating, via the processing circuitry, a candidate master document list using the one or more master documents identified based on the text search, extracting, via the processing circuitry, a plurality of features of the digital document, performing, via the processing circuitry, a comparison, after performing the text search, of the plurality of features of the digital document with features of the one or more master documents in the candidate master document list, and identifying, via the processing circuitry, a master document of the one or more master documents that matches the digital document based on the comparison of the features.

Further, according to an embodiment of the present disclosure, there is provided a non-transitory computer-readable medium which stores instructions which, when executed by a computer, cause the computer to perform the method mentioned above.

The forgoing general description of the illustrative implementations and the following detailed description thereof are merely exemplary aspects of the teachings of this disclosure, and are not restrictive.

BRIEF DESCRIPTION OF THE DRAWINGS

A more complete appreciation of the disclosed embodiments and many of the attendant advantages thereof will be readily obtained as the same becomes better understood by reference to the following detailed description when considered in connection with the accompanying drawings, wherein:

FIG. 5A illustrates an exemplary form according to an embodiment of the present disclosure;

FIG. 5B is an example of a filled Application Data Sheet (ADS) form according to an embodiment of the present disclosure;

FIG. 5C is an example of a ADS master document according to an embodiment of the present disclosure;

DETAILED DESCRIPTION

Figure 1:
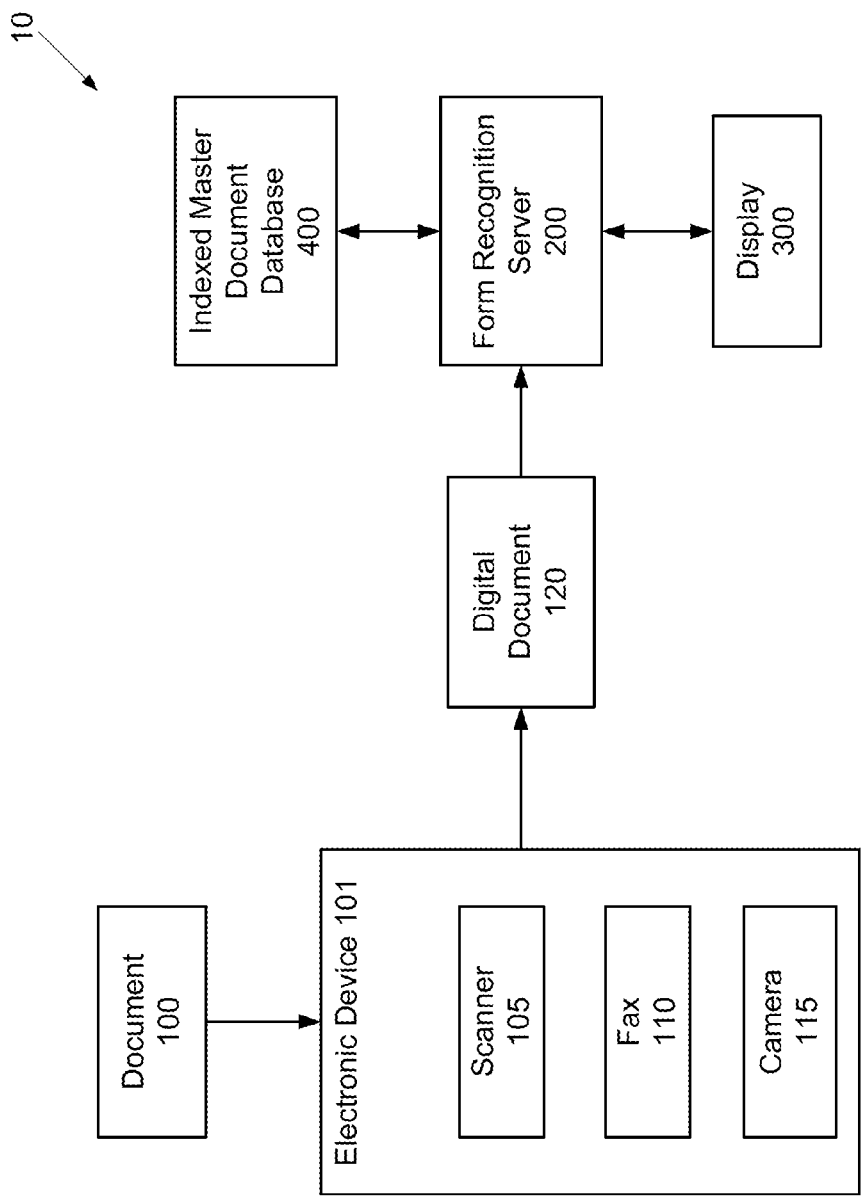
FIG. 1 is a block diagram of a form recognition system according to an embodiment of the present disclosure.

In the drawings, like reference numerals designate identical or corresponding parts throughout the several views. Further, as used herein, the words "a", "an" and the like generally carry a meaning of "one or more", unless stated otherwise. The drawings are generally drawn to scale unless specified otherwise or illustrating schematic structures or flowcharts.

Furthermore, the terms "approximately," "proximate," "minor," and similar terms generally refer to ranges that include the identified value within a margin of 20%, 10% or preferably 5% in certain embodiments, and any values therebetween.

The term "user" and other related terms are used interchangeably to refer to a person using form recognition circuitry, a form recognition system, or a system sending inputs to the form recognition circuitry/system.

FIG. 1 is a block diagram of a form recognition system 10 according to an embodiment of the present disclosure. The form recognition system 10 includes a digital document 120, a form recognition server 200, and an indexed master document database 400. The form recognition server 200 is configured to receive a digital document 120 and communicate with the indexed master document database 400.

The digital document 120 can be a digital version of a document 100 that exists in a digital environment and can be stored or displayed on electronic media]. The digital document 120 can be in any format such as pdf, image, word, or other digital formats known to a person skilled in the art.

The document 100 can be any artifact having textual content. The document 100 can be a form with input fields that can be filled by a user, a personal identification document that can include text, images or other identifiers, a letter, a note, or the like.

An unfilled form or document used to collect data or a document used as an exemplary for a kind of documents is referred as a master document. A master document may contain a single page or multiple pages. Alternatively or in addition, a master document can be a filled document, for example, a W2 form of previous year having a person's information, or a filled Application Data Sheet (ADS) form related to a filed patent application that was digitally stored in a memory. The master document can be digitally stored in a database of the form recognition server 200 and used for matching with the digital document 120. For example, a W2 tax form can include tax information of a user, while an ADS of a patent application can be used to collect data about an inventor. An unfilled W2 form can be referred as a master document of W2. Similarly, unfilled ADS can be referred to as a master document of ADS. In another example, a filled W2 form of a previous year of a client (e.g., John Doe) can serve as a master form for a filled W2 form of a current year for the same client (i.e., John Doe).

A form can have a specific layout with information (in textual and/or graphical format) distributed at different locations and/or sections on a page. For example, a form can have a header section at the top of the page, a footer section at the bottom of the page, a signature section above the footer, etc. An example form layout is illustrated in FIG. 5A.

Furthermore, the document 100 or the digital document 120 can include different features. Features can be defined as characteristics and attributes of a form or document, e.g., text, barcodes, lines, graphics, shapes, color, structures, format, and layout. Further, each feature can be associated with a location and/or a section of the document 100 or 120 to generate a location specific feature. For example, referring to FIG. 5A, the features can be a header layout including a form name at location L1, an image at location L2, an identifier at location L3, and a footer layout including a page number at location L7. Another feature can be a section including Personal Details at location L4 and a Declaration at location L5. Another example feature can be a signature field at location L6. Optionally, the features can be converted to a text format. For example, an image can be represented by a size (e.g., size 2×2 inches) or geometric shape, by a barcode that can be converted to numbers or alphanumeric characters, etc.

Referring back to FIG. 1, the document 100 can be converted to digital form via an electronic device 101. The electronic device 101 can be or can include a scanner 105, a fax machine 110, a camera 115 or other similar devices. It can be appreciated by a person skilled in the art that the present disclosure is not limited to any particular electronic device 101.

The form recognition server 200 can implement a server-centric architecture. The form recognition server 200 can be configured to receive the digital document 120, extract a textual content (and/or graphical content) from the digital document 120, identify a master document corresponding to the digital document 120 based on the textual content (and/or graphical content), and display the identified master document on a display 300. The form recognition server 200 can be further configured to identify and extract various features from the digital document 120. The features can be characteristic properties of the master document or of the document 100 being considered that can be further supplemented with associations such as location on a page, section within which the feature was identified, type of feature, etc.

The form recognition server 200 can implement a process of form recognition, discussed with respect to FIGS. 2A and 2B below. The form recognition server 200 can also implement the process of generating an indexed master document database as discussed with respect to FIG. 3. Furthermore, the form recognition server 200 can implement a process of extracting features from a master document as discussed with respect to FIG. 4. Of course, such processes can be distributed among other servers/devices.

The indexed master document database 400 can be on any device that includes a repository of master documents that are indexed. The indexed master document database 400 can store a large number of master documents (e.g., more than 500,000) in an indexed format and can allow access to the indexed master documents via queries from the server 200 or a user's device.

In one embodiment of the present disclosure, the form recognition server 200 can be configured to include and/or generate the indexed master document database 400. Alternatively or in addition, the indexed master document database 400 can be on a different server configured to communicate, via a network, with the form recognition server 200. The present disclosure considers, for simplicity, that the indexed master document database 400 is implemented within the form recognition server 200.

Figure 2A:
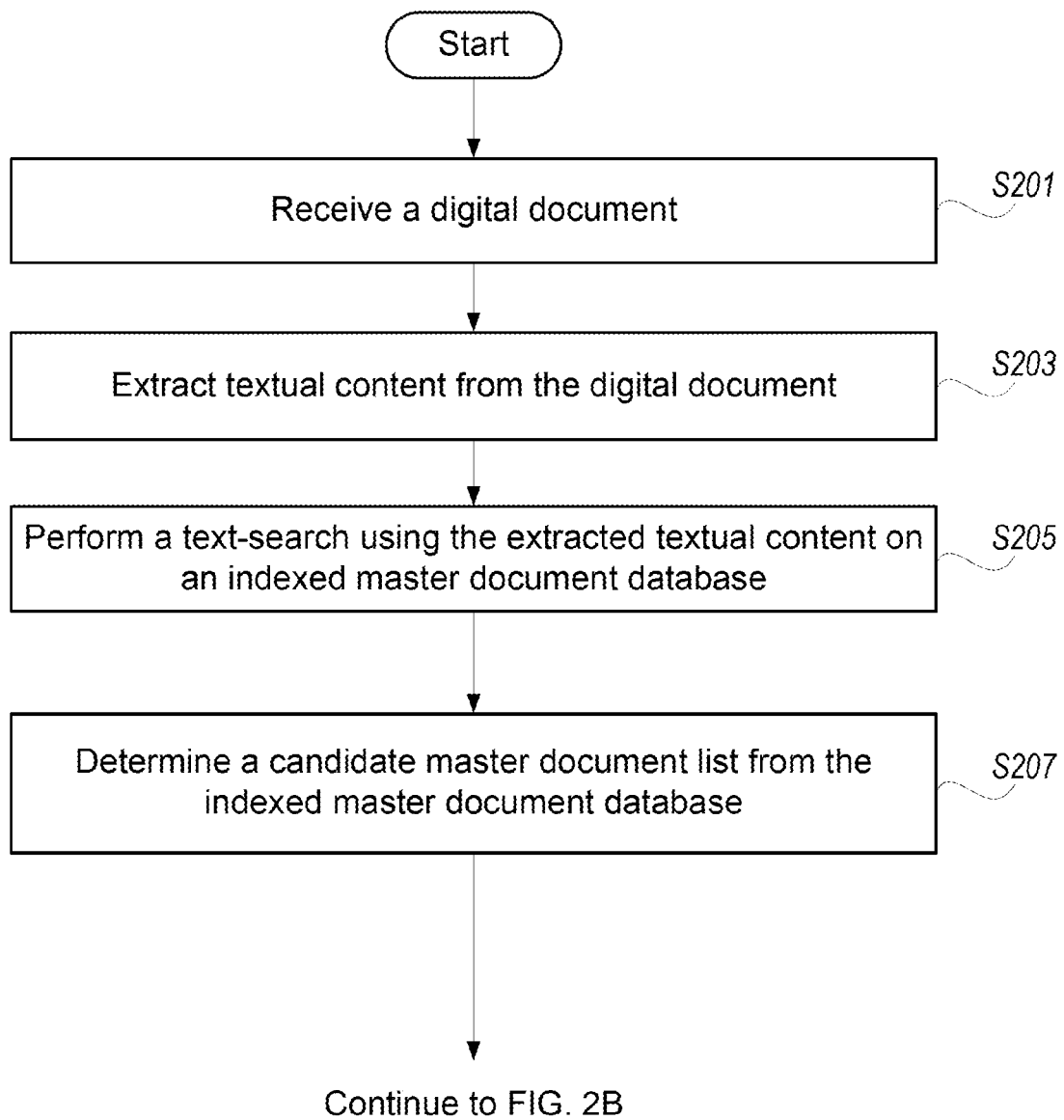
FIGS. 2A and 2B are flow charts illustrating a form recognition process according to an embodiment of the present disclosure.
Figure 2B:
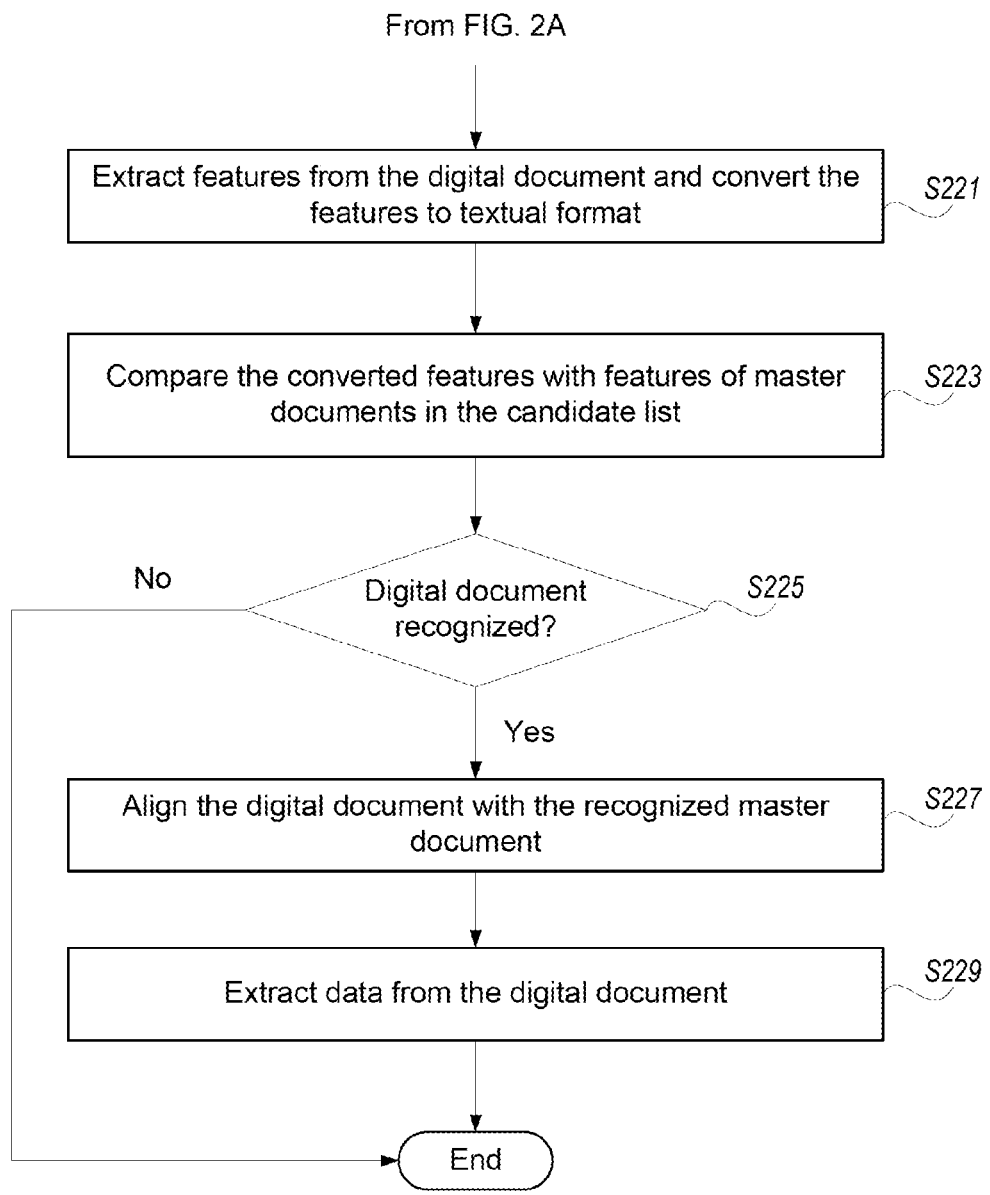

FIGS. 2A and 2B are flow charts illustrating a form recognition process according to an embodiment of the present disclosure. The process starts when the document 100 is converted to a digital document 120 and the form recognition server 200 (referred to as server 200 hereinafter) is activated.

In step S201, the server 200 can receive, via a network, the digital document 120. For example, the digital document 120 (e.g., a form in FIG. 5A, a W2 tax form, an ADS of a patent application, an Information Disclosure Statement (IDS) related to a patent application, etc.) can be received by the server 200 in a pdf format via an email.

In step S203, the server 200 can extract textual content from the digital document 120. The textual content refers to text within an unfilled digital document 120, particularly all the text other than user inputs. The textual content can be a letter, a word or a string of words. For example, referring to FIG. 5A, the textual content can include a form name, an identifier, a name of a person, an address, Social Security Number (SSN), a phone number, "This is to certify . . . ", a signature, and a page number. The server 200 can extract the entire or full textual content or a partial textual content. The entire textual content (also referred as "full text") refers to the textual content present before the document 100 is populated with user inputs. Note that user inputs may refer to any type of information (written/typed or graphic) that is either entered by a user/person/organization or pertains (or is specific) to a user/person/organization that can be received via a network or retrieved from memory. In other words, user inputs may refer to information other than the boilerplate/standard language found in a document or form.

Optionally, the user inputs may be extracted as well. However, the user inputs may be ignored or omitted during the full text search. User inputs refer to data provided by a user within the document 100 or 120. User inputs can include text, a signature, a photo, or other inputs requested from the user in the document 100 or 120. Thus, the full text of the digital document 120 can be all the text of a corresponding form's template/standard language or a corresponding master document.

Although extraction of full textual content is preferred, the server 200 can be configured to extract partial textual content. For example, the server 200 can be configured to extract the textual content in a header and/or footer only. The header refers to text within a top portion of the digital document 120, while the footer refers to a bottom portion of the digital document 120, as can be understood by a person skilled in the art.

In one embodiment, an Optical Character Recognition (OCR) process can be used to determine (and extract) the textual content. In some implementations, textual content can be determined or extracted by reading file information, and metadata and text stored in the digital document file e.g., word files or pdf files. However, the present disclosure is not limited to an OCR-based text extraction and any other method of text recognition and extraction can be used.

Furthermore, the textual content can include text entered by a user in an input field, for example, a name "John Doe" and an address "Cool Tech, Inc., 100 S Base Street, Suite C, Charlotte, N.C. 28000 USA". The textual content can be typed or handwritten. The server 200 can be configured to identify user inputs and omit the user inputs during a text search.

In step S205, the server 200 can perform a text search using the extracted textual content on the indexed master document database 400. The text search can compare the extracted textual content with the indexed master documents stored in the indexed master document database 400 to find a match. For example, the extracted textual content can be fields such as the form name, the identifier, the name, the address, SSN, the phone number, "This is to certify . . . ", the signature, and the page number that are compared with the textual content of indexed master documents stored in the indexed master document database 400.

The text search can return no matching master document, one matching master document, or several matching master documents. For example, the text search can output two master documents that match the extracted textual content in entirety. In another example, the text search can output five master documents that match a part of the extracted textual content including a name, an address, SSN, a phone number, "This is to certify . . . ", a signature, and a page number. The search process on the indexed master document database 400 is further discussed with respect to FIG. 3.

The comparison of the extracted textual content can result in approximately 100% match or less than 100% match. For example, all the extracted textual content of a W2 tax form can match approximately 100% with a W2 master document. On the other hand, the extracted textual content of a W2 form may have a match of approximately 30% with an unrelated ADS master document.

The form recognition process, according to the present disclosure, that performs a full text search first (before performing a feature-to-feature comparison) is fast and highly accurate. Such a form recognition process can be more than 100 times faster than typical form recognition process because the typical form recognition process involves layout-based or image-based comparisons having a high execution time. In addition, the execution time can further increase depending on the number of master documents in the master repository, as the typical process involves comparison with every master document stored in the master form repository, which may contain thousands of master documents, leading to a substantially increased execution time. The layout-based or image-based comparisons involve execution of a complex image matching algorithm having a high execution time. On the other hand, performing the text search first involves execution of a text search algorithm whose execution time is orders of magnitude faster than an image matching algorithm. As such, performing the text search first can narrow down a search space quickly.

Moreover, the text search can produce accurate matches, particularly when a master document has different versions with different layouts, since the text-based search compares the textual content within the master document, which remains substantially similar; while the layout-based search compares the layout, which can be different, thus an older version of a form may be omitted. As such, if the digital document 120 is a revised version of a particular master document and the indexed master document database 400 has an older version of the master document, the text search can recognize the older version of the master document, but the layout-based search may omit the older version as the layouts are different, for example, a company name or logo may be located at different positions on different versions of a particular document. Thus, the form recognition process according to present disclosure can recognize the master documents quickly and more accurately than a typical form recognition process.

In step S207, the server 200 determines a candidate master document list (also referred as a candidate list) based on a ranking of the search results of step S205. The candidate master document list includes a set of forms selected from the search result that have a high ranking. A high ranking indicates a high possibility that the digital document 120 is identified or recognized. For example, a W2 document having an approximately 100% match with a W2 master document will be highly ranked compared to approximately 30% match with an unrelated form such as an ADS master document. The candidate master document list can include none or at least one master document that appears to be a close match. Furthermore, to limit the number of master documents within the candidate master document list, a pre-determined threshold based on a percentage match or a number of master documents can be used. For example, the server 200 can omit results having less than 85% match to generate the candidate master document list. Alternatively or in addition, the sever 200 can limit entries in the candidate master document list to up to a particular number, for example, 20 master documents. The pre-determined threshold can be user-defined based on a percentage matching or a numerical value limiting the number of entries in the candidate master document list. An upper threshold for limiting the number of entries in the candidate master document list can be part of a system configuration that a user can specify according to his/her application and the number of similar master documents stored in the repository, for example, in a system the default value can be set to 5 and the user can be allowed to change the default value to a higher or lower number. The user may change the default value to 20 if the number of similar master documents in the repository is high, for example, 5 similar master documents of each type of, for example, 100 master documents.

When the candidate list includes one master document, the server 200 can further perform steps S221 and S223 (in FIG. 2B) to confirm that the recognized master document in the candidate list is correct or accurate. For example, the digital document 120 can be an informal letter or an email that describes the purpose of a formal letter. The master document can be a "formal letter" that has a standard format such as a company logo at top right hand corner, name and address of the company sending the formal letter at a top center, a body describing the purpose of the formal letter, a signature at bottom right corner, etc. The body of the formal letter can have textual content similar to the informal letter describing the purpose of the formal letter. In such a case, there may be a mismatch between the recognized master document (e.g., the formal letter) and the digital document 120 (e.g., the informal letter) because although the two documents may contain the same (or similar) text, the documents themselves may actually be different (one being formal and having the company logo, etc., while the other may simply include text). As such, additional verification or confirmation, for example, comparing one or more features such as the company logo or the signature field, may be desired. Alternatively, when the candidate list includes one master document, the server 200 can skip the steps S221, S223, and S225, and perform steps S227 and S229 further discussed as follows. For example, when the digital document 120 is a document that is compared to a master document having different versions with different layouts, as discussed earlier.

In step S221 (continued in FIG. 2B), the server 200 can extract different features of the digital document 120 to narrow down the search results, since more than one master document in the candidate list can indicate there are too many common or generic forms similar to the digital document 120. For example, the digital document 120 can include commonly found textual content such as name of a person, an address, a signature, etc. that can appear in millions of documents, but the digital document 120 may not include enough unique textual content specific to a master document to narrow down the search results. In such cases, additional filtering of the search results based on features of the digital document 120 may help limit the search space. The features can be associated with a location within the digital document 120 or a section of the digital document 120. The location identifies a position of a feature within a digital document 120. The location can be identified using one or more of geometric coordinate(s), a distance measure, a relative position with respect to a reference point such as a section of the form, a barcode, a form name, a bottom of the page, a top of the page, or other similar ways of identifying a position of a text. In one example, the server 200 can identify a feature such as a barcode as a reference point and associate other features with respect to the barcode. For example, an image can be at a distance 5 mm from the barcode. Alternatively or in addition, the server 200 can associate an x-y coordinate to each feature, e.g., (5 mm, 5 mm) for a signature, (10 mm, 50 mm) for an image, (50 mm, 50 mm) for a form name, etc. Furthermore, the feature can be converted to text and the converted text can be further used to perform a full text search within the indexed master document.

In step S223, the server 200 compares the extracted features with the features of master documents stored in the indexed master document database 400. In one embodiment, the server 200 can compare one or more specific features such as a bar code, a form name or a location of a logo. The specific feature can be predetermined and is customizable based on the particular application and stored in the server 200. The extracted features can be converted to a format similar to that of the master documents stored within the indexed master document database 400 for faster and more accurate comparison. For example, the format can be a string of features, where each feature can be associated with a location, or the format can include a description for feature types, e.g., image, line, and barcode. Furthermore, each such feature can be separated by a separator such as a comma, a semicolon, slash or other appropriate symbols to form a string of features. For example, the features can be the size of an image at location L2, a barcode at location L3 acting as an identifier, etc.

The comparison of the extracted features can result in a 100% match or less than 100% match. For example, all the extracted features of a W2 document can match with a W2 master document. On the other hand, only 10% of the extracted features of the W2 document may match with an unrelated ADS master document because the W2 document and ADS master document have different layouts. For example, the feature such as a bar code of the W2 document may be located in a different location than the bar code of the ADS master document, a form name of the W2 document may be located in a top left corner while the form name of the ADS master document may be located at a center at the top of the ADS master document, number of pages in the W2 document can be one while the number of pages in ADS master document can be three, and other layout based features may be different.

In step S225, the server 200 determines whether the digital document 120 is identified or recognized. The determination can be based on a threshold such as greater than an 85% match. When the digital document 120 is not recognized, the server 200 can generate a message indicating unknown or unrecognized document and send it to the display 300. When the candidate is empty or includes too many master documents (e.g., more than 20), the server 200 indicates the digital document 120 is not identified. A threshold for a number of candidate master documents can be predefined by a user or the server 200. Alternatively or in addition, the master document with the highest confidence level is reported. If the confidence level is less than a pre-determined threshold, e.g., 50%, the server 200 indicates the digital document 120 is not identified.

When the candidate master document list includes a reasonable number of master documents (e.g., up to 5 master documents, which can be a predefined threshold or a threshold automatically defined by the server 200 based on past performance), the server 200 indicates the digital document 120 is identified. Once the digital document 120 is identified, optionally, the server 200 can display a master document with highest ranking within the candidate master document list on the display 300. The user can further confirm or request the server 200 to display a next document from the candidate list.

Furthermore, in step S227, the server 200 aligns the digital document 120 with the recognized master document and extracts the alignment information. The alignment can involve modifying the size, orientation or performing other image processing functions on the digital document 120 and/or the recognized master document. Such alignment sets up the digital document 120 for data extraction.

After aligning the digital document 120 with the master document, in step S229, the server 200 extracts data (e.g., user inputs) from the digital document 120. The data can be extracted using an OCR process or other image processing functions. The data can correspond to user input fields that can be filled (handwritten or typed) within the digital document 120. For example, the digital document 120 can be an ADS of a patent application and the data extracted can include the name "John Doe" and the address "Cool Tech, Inc., 100 S Base Street, Suite C, Charlotte, N.C. 28000 USA".

The server 200 can be further configured to use the extracted data to organize and store the information in the digital document 120 according to client details, document type, etc. The client can be a name of person (e.g., John Doe) or an organization (e.g., Cool Tech, Inc.) identified from the digital document 120. The extracted data can be stored, in the memory of the server 200, a client-specific folder or other folders based on a folder organization system. Alternatively or in addition, the extracted data can be used to identify a person in charge of handling the digital document 120 and automatically email/forward the digital document 120 to the person in charge. In another example, the digital document 120 can be annotated to hide sensitive information in the digital document 120 from none authorized people using digital marks or redaction annotations. In another example, the digital document 120 can be sorted/organized to have all pages in correct order, particularly when the digital document 120 is scanned while pages are not in order. In another example, a part of the extracted data can be used to identify location (e.g., one or more pages, i.e., not all pages) in the digital document and attach the identified pages to an application such as in a follow up procedure.

The server 200 configured to perform the form recognition processes according to the present disclosure can be used in an office environment of a business, consulting services, or for personal use at home. For example, at an intellectual property law firm, the server 200 can be used to identify patent filing related documents such as an IDS, ADS, an oath and declaration, and an assignment form, for different patent applications or different clients. Each document may include an identifier to indicate a particular client or a case number. In another example, the server 200 can be used by a tax consultant who may receive several thousands of documents from clients for tax filing purposes. The tax consultant can upload the documents to the server 200 and the server 200 can recognize each of the documents. Furthermore, the server 200 may sort, store and organize the recognized documents within a client-specific folder, thus saving the tax consultant a substantial amount of effort and time.

Figure 2C:
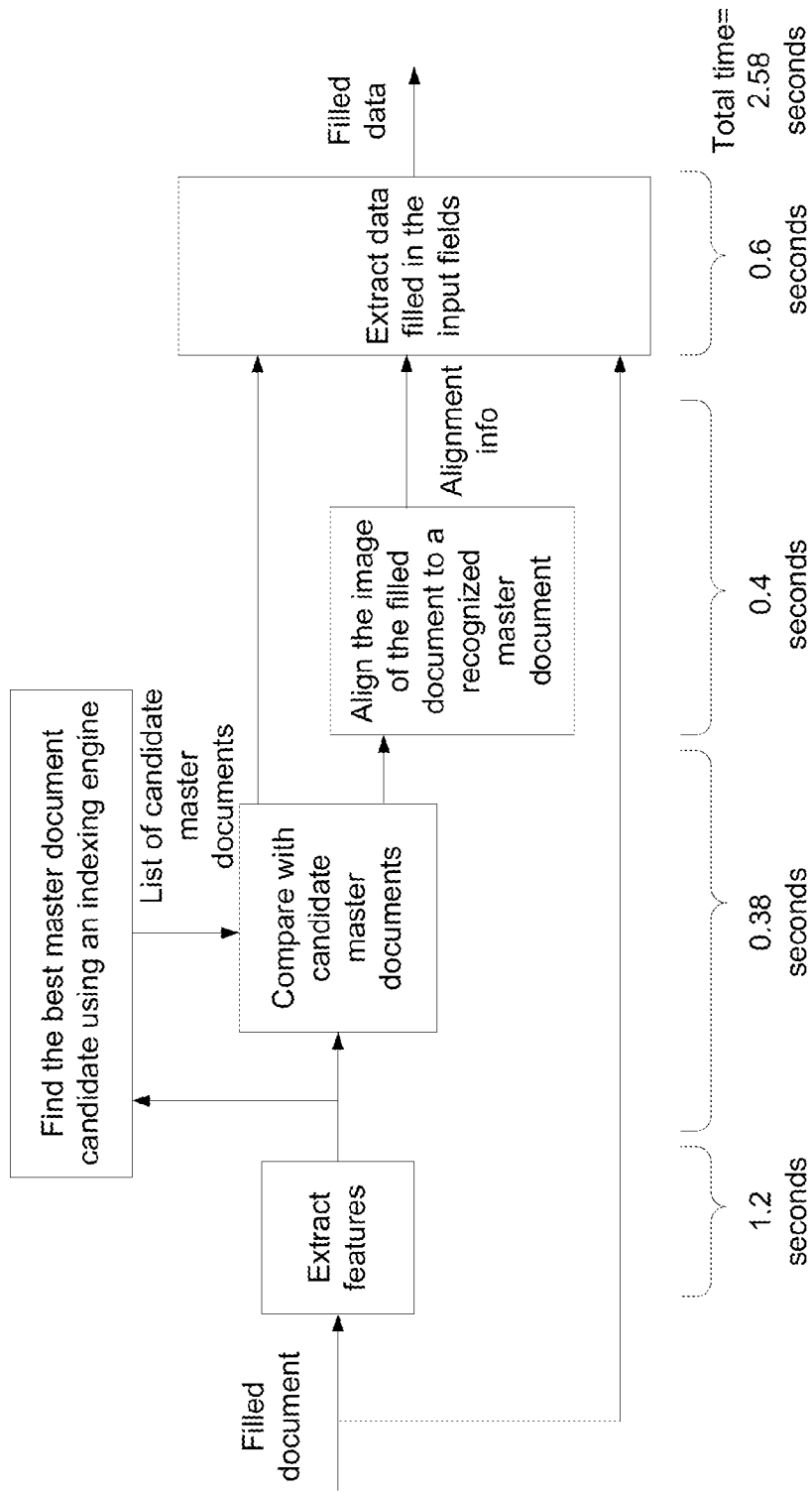
FIG. 2C is an example of the form recognition process according to an embodiment of the present disclosure.

FIG. 2C is an example of the form recognition process discussed in FIGS. 2A and 2B according to an embodiment of the present disclosure. In FIG. 2C, the server 200 receives a filled document (i.e., the digital document 120). The server 200 extracts features, particularly the full textual content and other features of the filled form, as discussed in step S203 and step S221 in FIGS. 2A and 2B. The feature extraction can take, for example, approximately 1.2 seconds. The full textual content is further used to find a best master document candidate, i.e., master documents having high matching likelihood, as discussed in step S205 and S207 of FIG. 2A. After performing the full text search, the server generates a list of candidate master documents. The server 200 further compares the extracted features with the candidate master documents, as discussed in step S223 of FIG. 2B, and identifies or recognizes a master document from the candidate master documents. The process of generating the candidate master documents and comparing the features with the candidate master documents to recognize the master document can take, for example, approximately 0.38 seconds. On the other hand, typical form recognition process based on image or layout-based comparison can take orders of magnitude longer, approximately 10.8 seconds, to identify a matching master document from the master document repository, as such algorithms are complex and have high execution time.

The server 200 can be further configured to align the image of the digital document 120 with the recognized master document and extract the alignment information (e.g., offset and scaling factor related to, for example, lines matching lines, text matching text, etc.). The alignment process can take, for example, approximately 0.4 seconds. In one embodiment, the alignment process can be a standard process as known to a person skilled in the art. Once the digital document 120 is aligned with the recognized master document, the server 200 can extract data filled in the input fields of the digital document 120 that correspond to the input fields of the recognized master document, as discussed in step S229 of FIG. 2B. Such data extraction can take, for example, approximately 0.6 seconds. Therefore, a total time taken to recognize the master document corresponding to the digital document 120 using a full text search and extracting filled data, according to the present disclosure, can be, for example, 2.58 seconds. By contrast, a typical recognition process may take upwards of 13 seconds to provide a result. Accordingly, the present process substantially reduces the processing time while also improving the quality of the results. This addresses a problem in the technological field of document or form recognition, a problem that has plagued the industry for some time.

The results obtained from the form recognition process can be further used by the server 200 for various purposes. The server 200 can be further configured to organize several digital documents 120 by storing the documents in a folder corresponding to a case number, a name of a client or a person, a document type, etc. The server 200 can also be configured to sort the digital documents 120 based on a form name, case number, client, etc.

Figure 3:
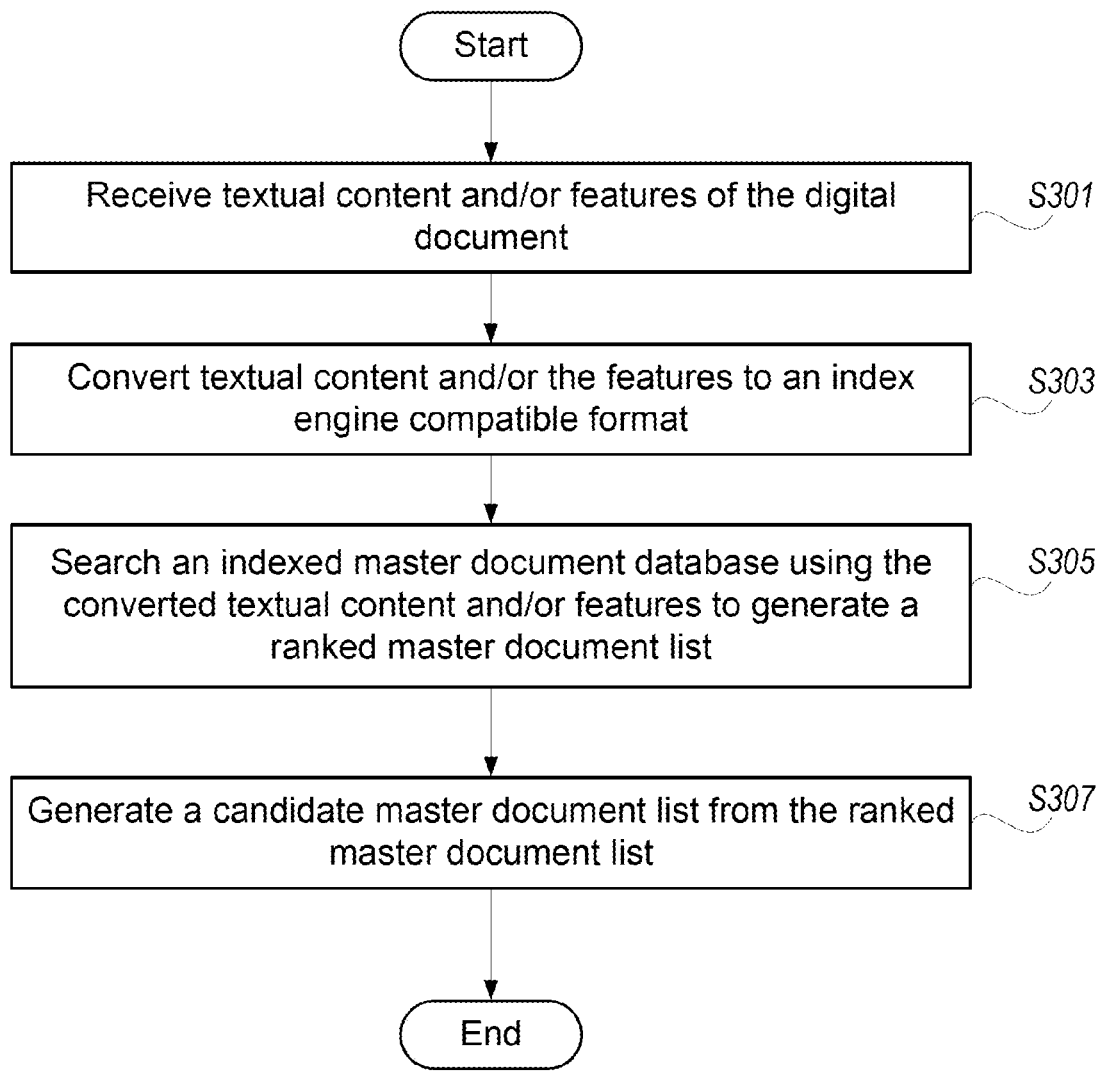
FIG. 3 is a flow chart illustrating a process for generating a candidate master document list according to an embodiment of the present disclosure.

A process of generating the candidate master document list, discussed with respect to the step S207 in FIG. 2A, is further illustrated in FIG. 3. In FIG. 3, the process starts when the server 200 receives a digital document 120 and the textual content and/or features are extracted from the digital document 120, as in step S203 of FIG. 2A.

In step S301, the server 200 can receive the textual content and/or features of the digital document 120. The textual content can be a letter, a word or a string of words. For example, referring to FIG. 5A, the textual content can include a form name, an identifier, a name, an address, SSN, a phone number, "This is to certify . . . ", a signature, and a page number. Alternatively or in addition, the textual content can be associated with a location such as locations L1-L7. Such text-location association can be a feature of the digital document 120. Furthermore, features can include images, barcodes, geometric properties of a section or an image, etc. Alternatively or in addition, the aforementioned features can be associated with a location. The location can be based on an x-y coordinate system or a relative position with respect to other features or sections.

In step S303, the server 200 can convert the extracted textual content and the features to an index engine compatible format that is used to generate the indexed master document database 400. Using compatible formats can enable faster and accurate comparison, so accurate search results can be obtained quickly.

In step S305, firstly, the server 200 can perform a text search using the extracted textual content of the digital document 120 on the indexed master document database 400. The extracted textual content can be distributed across different pages or different locations of a master document. As such, the search may find, for example, one thousand (1000) results matching the form name, zero (0) results matching the identifier, one million (1,000,000) results matching the name of a person, one hundred thousand results (100,000) matching the address, fifty thousand (50,000) results matching the SSN, one thousand (1000) results matching a phone number, one thousand (1000) results matching "This is to certify . . . ", a thousand (1000) results matching a signature, and a thousand (1000) results matching a page number.

The server 200 is configured to rank the search results based on the percentage matching of the textual content. The ranking can be enabled via a ranking engine such as a MICROSOFT Structured Query Language (SQL) Server and APACHE LUCENE. It should be noted that the present disclosure is not limited to a particular ranking engine or method and any ranking engine or method can be used as understood by a person skilled in the art.

Optionally, the server 200 can perform a feature-based search using the search results of the text search to further narrow the search results. The server 200 can be further configured to rank the text-based search results based on the feature matching.

In step S307, the server 200 can generate a candidate list from the ranked master document list. The candidate list can be generated based on factors such as a text-matching percentage, a feature matching percentage or a combination thereof. Another factor can be the maximum number of candidate master documents in a candidate list specified in the system configuration. The server 200 can send this candidate list to the display 300, where a user can view the list, select a master document from the candidate list or perform other operations.

Figure 4A:
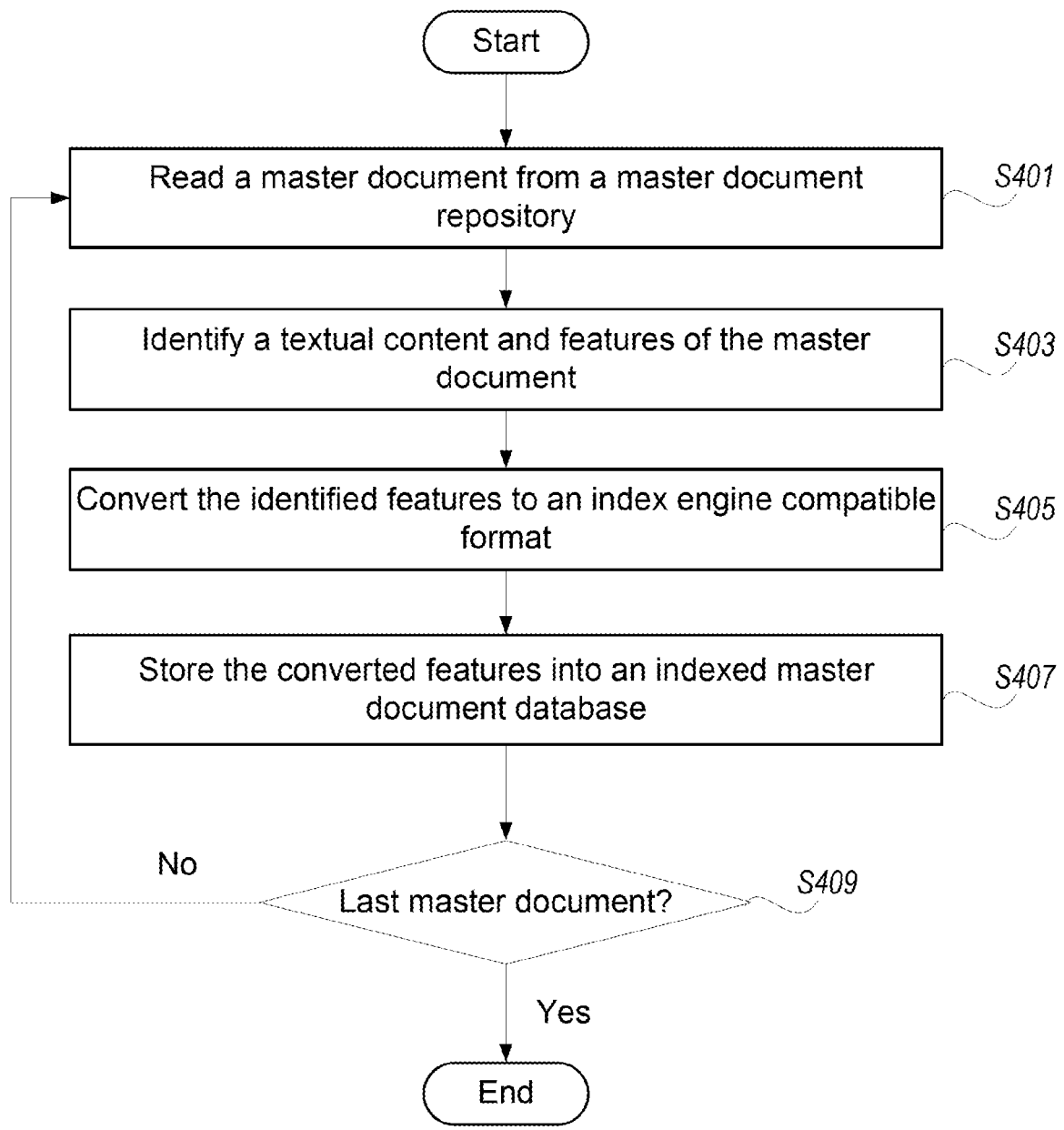
FIG. 4A is a flow chart illustrating a process for generating an indexed master document database according to an embodiment of the present disclosure.

FIG. 4A is a flow chart illustrating a process for generating an indexed master document database that is used in the process of FIGS. 2A, 2B and 3, particularly in steps S205, S223 and 305 for performing a full text search, according to an embodiment of the present disclosure. The process starts when the server 200 receives a master document in a digital form and stores the master document in a master document repository 660 (in FIG. 6) or when a user activates the process to generate the indexed master document database 400.

In step S401, the server 200 reads a master document stored in the master document repository 660. In step S403, the server 200 identifies the textual content and features of the master document. In step S405, the textual content and the features are converted to an index engine compatible format. For example, the format can be text format, a hash table, binary tree or other indexing formats. The indexing engine can be Microsoft SQL and Azure SQL Server Full-Text Search, Apache Lucene Core and the language can be any query language supported by the index engine such as SQL or Lucene Query Parser Syntax that can accept queries from a user or other servers and allows search based on the queries or any query language supported by the index engine. In step S407, the server 200 can store the converted textual content or features in a database to form the indexed master document database 400.

In step S409, the server 200 determines whether the master document read from the master document repository 660 is a last master document in the master document repository 660. If the master document repository includes more master document, the server 200 proceeds to the next master document and the returns to step S401. When the last master document is indexed, the process ends and an indexed master document database 400 is generated.

Figure 4B:
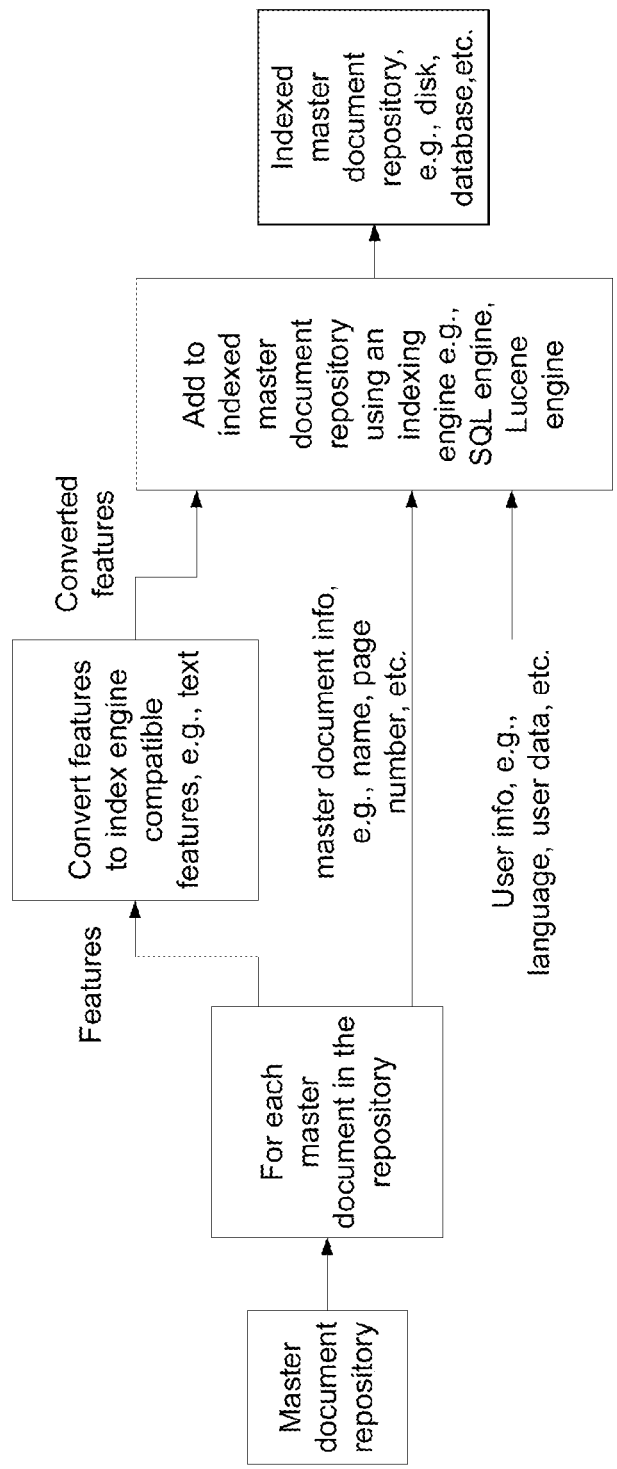
FIG. 4B is an example of the process for generating the indexed master document database according to an embodiment of the present disclosure.

FIG. 4B illustrates an example of generating the indexed master document database or database discussed above. The server 200 can read each master document in the master document repository. For each master document, the server 200 extracts features including textual content from the master document and converts the features to index engine compatible features e.g., text. Also, for each master document, the master document related information such as a form name, page number, etc. can be extracted. The converted features and the master document information can be added to the indexed master document database 400 using an indexing engine e.g., SQL engine, Lucene engine, etc. In addition, user information e.g., language, or other user specific data can also be added to the indexed master document database. The indexed master documents can be stored on, for example, a disk, memory, or a database of the server 200.

The above process discussed with respect to FIGS. 2A-2C, 3, and 4A-4B are further discussed with an example ADS form as follows. FIG. 5B illustrates a filled ADS 500B, which is an example of the digital document 120 received by the server 200. The full text of the filled ADS 500B includes the following textual content:

"Application Data Sheet 37 CFR 1.76 Attorney Docket Number 50001US Application Number A1 Title of Invention Test Form Recognition Device The application data sheet is part of the provisional or nonprovisional application for which it is being submitted. The following form contains the bibliographic data arranged in a format specified by the United States Patent and Trademark Office as outlined in 37 CFR 1.76. This document may be completed electronically and submitted to the Office in electronic format using the Electronic Filing System (EFS) or the document may be printed and included in a paper filed application. Secrecy Order 37 CFR 5.20 Portions or all of the application associated with this Application Data Sheet may fall under a Secrecy Order pursuant to 37 CFR 5.2 (Paper filers only. Applications that fall under Secrecy Order may not be filed electronically.) Inventor Information: Inventor 1 Legal Name Prefix Given Name Middle Name Family Name Mr. John Doe Residence Information City Charlotte State/Province NC Country of Residence USA Mailing Address of Inventor: Address 1 100 S Base Street, Address 2 City Charlotte State/Province NC Postal Code 2800 Country Correspondence Information: Enter either Customer Number or complete the Correspondence Information section below. For further information see 37 CFR 1.33(a).0 An Address is being provided for the correspondence Information of this application. Customer Number 22000 Email Address johndoe@cooltech.com Application Information: Title of the Invention Test Form Recognition Device Attorney Docket Number 50001US Small Entity Status Claimed 0 Application Type Nonprovisional Subject Matter Utility Total Number of Drawing Sheets (if any) 10 Suggested Figure for Publication (if any)."

The server 200 extracts the full text of the filled ADS 500B, above. Note that the text includes the user inputs such as "50001US", "Test Form Recognition Device", etc. that are filled with information pertaining to a user (e.g., John Doe) in the digital document 120. It can be understood by a person skilled in the art that the full text of the ADS 500B can be represented in a different format. For example, the full text may be amended to include separators, quotation marks, location tags, etc. after a string of words, for example, "Application Data Sheet 37 CFR 1.76 "," Attorney Docket Number", "50001US", "Application Number", "A1", and so on.

The server 200 then performs a full text search using the full text (i.e., the text identified above) of the ADS 500B in the indexed master document database, as discussed in step S205 of FIG. 2A. The indexed master document database may include 10,000 different forms. Upon performing the full text search, the server 200 may find 50 different forms matching the full text of the filled ADS 500B. Note that these 50 different forms may include 3 different versions of ADS forms that may have changed over the years.

Figure 5C:
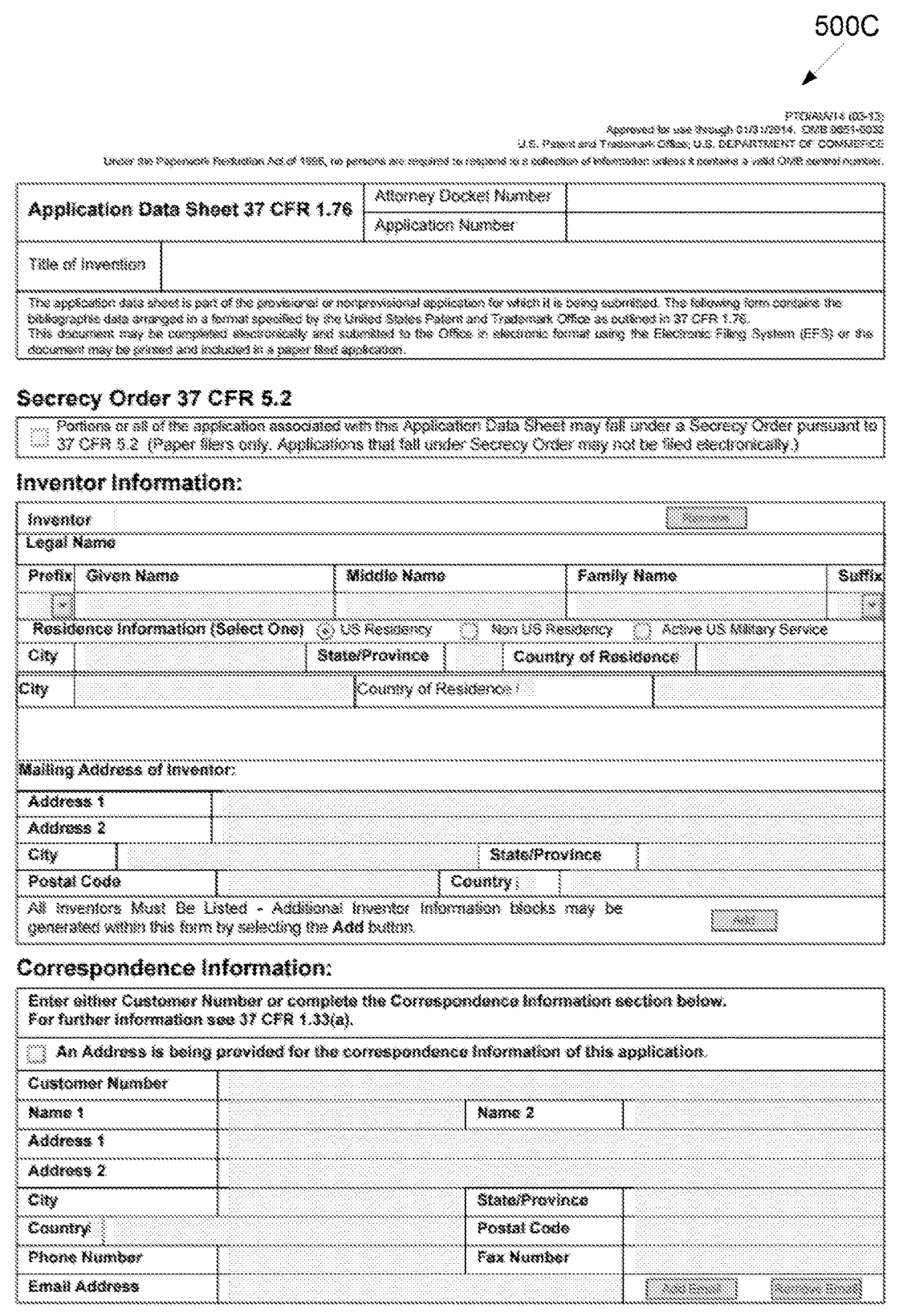

In one example comparison, the full text search may compare the full text of the filled ADS 500B to the full text of the ADS master document 500C, illustrated in FIG. 5C. The full text of the ADS master document includes the following textual content:

"PTO/AIA/14 (March 2013) Approved for use through Jan. 31, 2014. OMB 0651-0032 U.S. Patent and Trademark Office; U.S. DEPARTMENT OF COMMERCE Under the Paperwork Reduction Act of 1995, no persons are required to respond to a collection of information unless it contains a valid OMB control number. Application Data Sheet 37 CFR 1.76 Attorney Docket Number Application Number Title of Invention The application data sheet is part of the provisional or nonprovisional application for which it is being submitted. The following form contains the bibliographic data arranged in a format specified by the United States Patent and Trademark Office as outlined in 37 CFR 1.76. This document may be completed electronically and submitted to the Office in electronic format using the Electronic Filing System (EFS) or the document may be printed and included in a paper filed application. Secrecy Order 37 CFR 5.2 Portions or all of the application associated with this Application Data Sheet may fall under a Secrecy Order pursuant to 37 CFR 5.2 (Paper filers only. Applications that fall under Secrecy Order may not be filed electronically.) Inventor Information: Inventor Legal Name Prefix Given Name Middle Name Family Name Suffix Residence Information (Select One) US Residency Non US Residency Active US Military Service City State/Province Country of Residence Mailing Address of Inventor: Postal Code Country Address 1 Address 2 City State/Province All Inventors Must Be Listed—Additional Inventor Information blocks may be generated within this form by selecting the Add button. Correspondence Information: Enter either Customer Number or complete the Correspondence Information section below. For further information see 37 CFR 1.33(a). An Address is being provided for the correspondence Information of this application. Customer Number Email Address Application Information: Title of the Invention Attorney Docket Number Small Entity Status Claimed Application Type Subject Matter Total Number of Drawing Sheets (if any) Suggested Figure for Publication (if any)."

The server 200 can narrow down the search results from 50 forms to 3 forms, according to step S207 of FIG. 2A based on the ranking criteria. For example, ranking may include a percentage matching. Each of the 3 forms may have a matching percentage of more than 90%. Furthermore, the server 200 may omit the user inputs of the filled ADS 500B, thus increasing the percentage matching. Omitting the user inputs will increase the overall percentage matching, since the textual content (i.e., the user inputs) having low matching percentage is omitted. Generally, the user input may have a low matching percentage because the master documents stored in the indexed master document database 400 may not include user inputs or may have slightly different user inputs. Thus, omitting the user inputs may give a higher overall matching percentage of the filled ADS 500B with a corresponding ADS master document. The server 200 can then recognize the ADS master document 500C having a highest matching percentage of approximately 99%. Further, the recognized master document, i.e., the ADS master document 500C can be displayed on a display 300 of the server 200 or of the user device 700.

In the above example, the server 200 performs a full text search first, which narrows down the search space to, for example, 50 master documents quickly as the form recognition process does not compare the layout or image of the digital form 120 with, for example, the 10,000 master documents in the master repository. The server 200 further reduces the search space from 50 master documents to 3 master documents based on percentage matching without performing additional or more detailed layout or image-based comparisons. Hence, the server 200 narrows down the search results quickly. Moreover, the server 200 is able to recognize different versions of the same master document based on the textual content rather than the layout, thus accurately identifying a correct master document. The filled ADS 500B appears to be a latest version of the ADS master document and although an exact match based on the textual content was not found, a closest matching (i.e., approximately 99% match) master document (i.e., ADS master document 500C) was found in the indexed master document database 400 without comparing the layouts. The ADS master document 500C can be an older version of the latest ADS master document (not shown) that was not omitted by the server 200 during the search. Thus, the server 200 can recognize the master documents quickly and more accurately.

Each of the functions of the described embodiments may be implemented by one or more processing circuits (also referred as controller). A processing circuit includes a programmed processor (for example, a CPU 600 of FIG. 6), as a processor includes circuitry. A processing circuit may also include devices such as an application specific integrated circuit (ASIC) and conventional circuit components arranged to perform the recited functions. The processing circuit can be a part of the server 200 as discussed in more detail with respect to FIG. 6.

Figure 6:
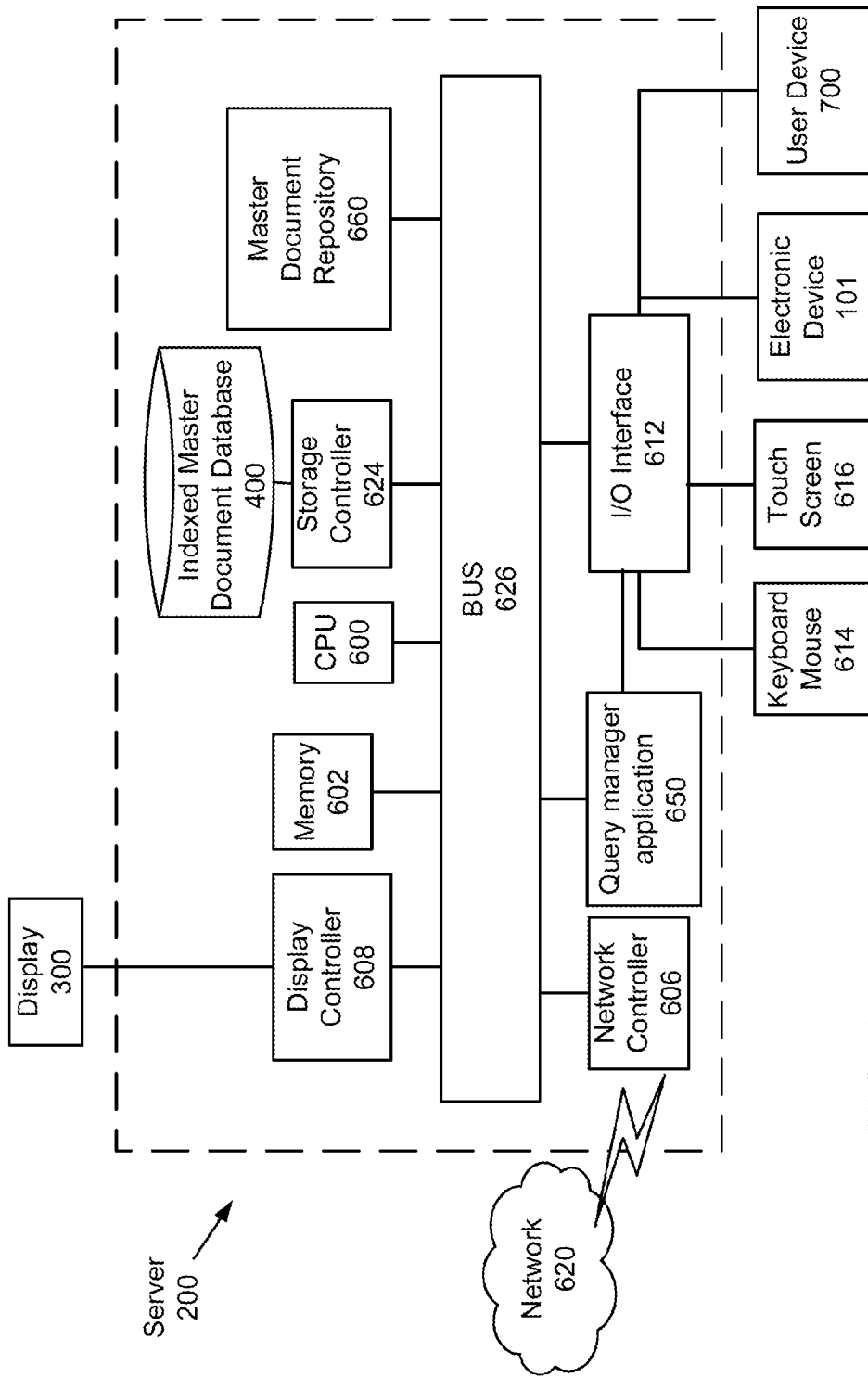
FIG. 6 is a detailed block diagram illustrating an exemplary server according to certain embodiments of the present disclosure.

FIG. 6 is a detailed block diagram illustrating an exemplary server 200 according to certain embodiments of the present disclosure. In FIG. 6, the server 200 includes a CPU 600, the indexed master document database 400, a master document repository 660, and a query manager application 650. In one embodiment, the master document repository 660 can be an external component connected via a network 620.

The CPU 600 performs the processes described in the present disclosure. The process data and instructions may be stored in a memory 602. These processes and instructions (discussed with respect to FIGS. 2A, 2B, 3 and 4A and 4B) may also be stored on a storage medium disk 604 such as a hard drive (HDD) or portable storage medium or may be stored remotely.

Further, the claimed advancements may be provided as a utility application, background daemon, or component of an operating system, or combination thereof, executing in conjunction with CPU 600 and an operating system such as Microsoft Windows or other versions, UNIX, Solaris, LINUX, Apple MAC-OS and other systems known to those skilled in the art.

The hardware elements in order to achieve the server 200 may be realized by various circuitry elements, known to those skilled in the art. For example, CPU 600 may be a Xenon or Core processor from Intel of America or an Opteron processor from AMD of America, or may be other processor types that would be recognized by one of ordinary skill in the art.

The server 200 in FIG. 6, also includes the network controller 606, such as an Intel Ethernet PRO network interface card from Intel Corporation of America, for interfacing with a network 620. As can be appreciated, the network 620 can be a public network, such as the Internet, or a private network such as an LAN or WAN network, or any combination thereof and can also include PSTN or ISDN sub-networks. The network 620 can also be wired, such as an Ethernet network, or can be wireless such as a cellular network including EDGE, 3G and 4G wireless cellular systems. The wireless network can also be WiFi, Bluetooth, or any other wireless form of communication that is known. The server 200 can communicate with external devices such as the electronic device 101 such as the scanner 105, the fax 110 and the camera 115, user device 700, etc. via the network controller 620.

The server 200 further includes a display controller 608, such as a NVIDIA GeForce GTX or Quadro graphics adaptor from NVIDIA Corporation of America for interfacing with display 300. An I/O interface 612 interfaces with a keyboard and/or mouse 614 as well as a touch screen panel 616 on or separate from display 300. Further, the server 200 can be connected to the user device 700 or the electronic device 101 via I/O interface 612 or through the network 620. The user device 700 can send queries that are handled by the query manager application 650 including extracting data from the indexed master document database 400 via the storage controller 624, from the master document repository 660, from the memory 602, or trigger execution of processes discussed in FIGS. 2A, 2B, 3, and 4A and 4B.

The storage controller 624 connects the storage mediums with communication bus 626, which may be an ISA, EISA, VESA, PCI, or similar, for interconnecting all of the components of the server 200. A description of the general features and functionality of the display 300, keyboard and/or mouse 614, as well as the display controller 608, storage controller 624, network controller 606, and the I/O interface 612 is omitted herein for brevity as these features are known.

In one embodiment, the server 200 of FIG. 6 can send results or receive a digital document, via the network 620, to/from a user device 700. For example, the user device 700 can receive, via the network 620, the recognized master document identified by the server 200 or a camera 709 of the user device 700 can capture an image of the document 100 and transmit the image to the server 200. Such a communication between the server 200 and the user device 700 can be particular useful when a user needs to fill out a form and send the information to a consultant, for example, a user may fill a 1040 form, capture an image of the 1040 form, and send the filled 1040 form (and a W2) to the server 200 that can be accessed by his/her tax consultant. The server 200 can recognize and extract data from the forms and send it to the user device 700 of the tax consultant. The user device 700 can also perform one or more functions of the server 200 on the hardware of the user device 700, further illustrated in FIG. 7.

Figure 7:
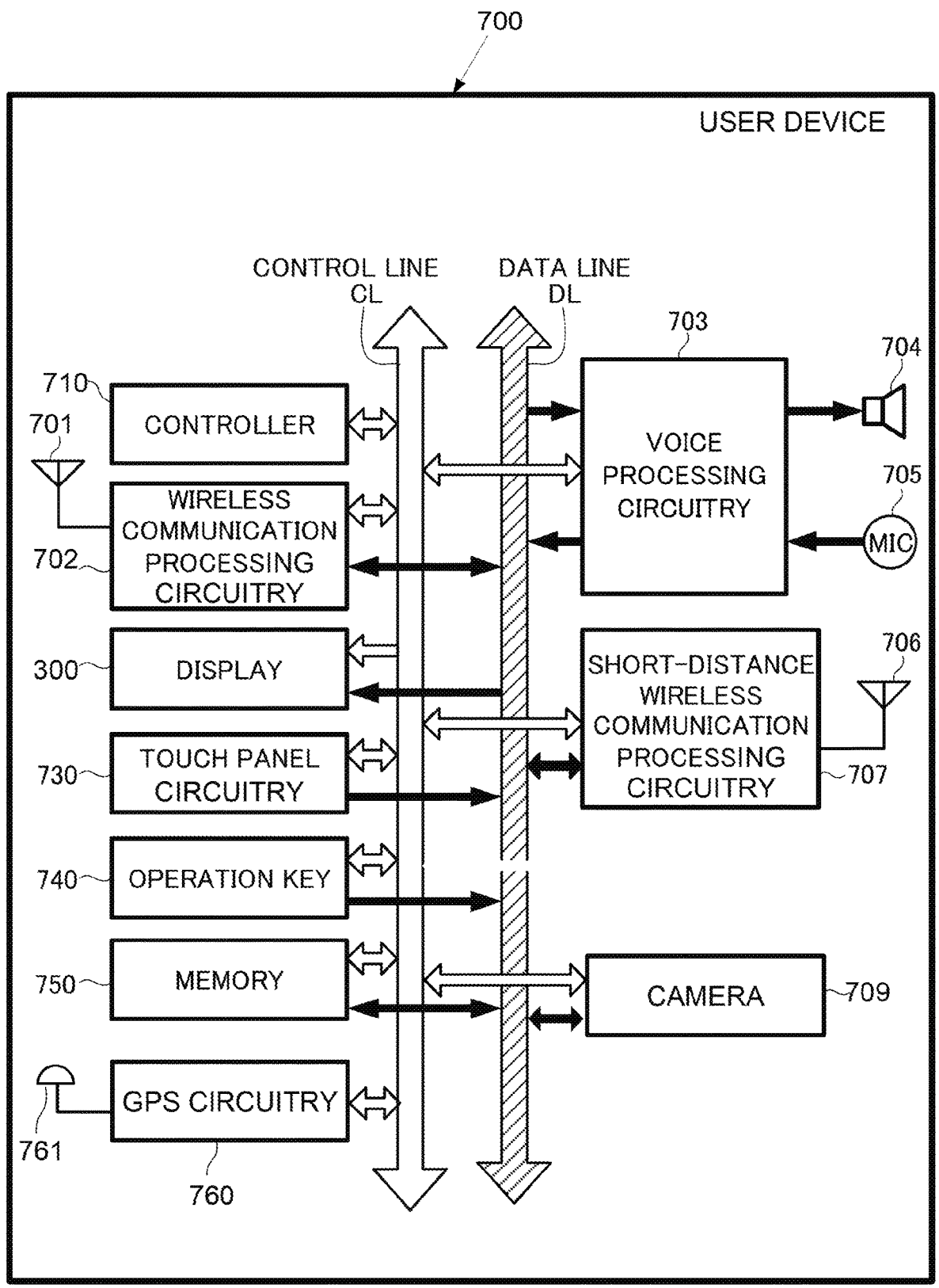
FIG. 7 is a detailed block diagram illustrating an exemplary user device according to certain embodiments of the present disclosure.

FIG. 7 is a detailed block diagram illustrating an exemplary user device 700 according to certain embodiments of the present disclosure. In certain embodiments, the user device 700 may be a smartphone. However, the skilled artisan will appreciate that the features described herein may be adapted to be implemented on other devices (e.g., a laptop, a tablet, a server, an e-reader, a camera, a navigation device, etc.). The exemplary user device 700 includes a controller 710 and a wireless communication processing circuitry 702 connected to an antenna 701. A speaker 704 and a microphone 705 are connected to a voice processing circuitry 703.

The controller 710 may include one or more Central Processing Units (CPUs), and may control each element in the user device 700 to perform functions related to communication control, audio signal processing, control for the audio signal processing, still and moving image processing and control, and other kinds of signal processing. The controller 710 may perform these functions by executing instructions stored in a memory 750. For example, the processes illustrated in FIGS. 2A, 2B, 3 and 4A and 4B may be stored in the memory 750. Alternatively or in addition to the local storage of the memory 750, the functions may be executed using instructions stored on an external device accessed on a network or on a non-transitory computer readable medium.

The user device 700 includes a control line CL and data line DL as internal communication bus lines. Control data to/from the controller 710 may be transmitted through the control line CL. The data line DL may be used for transmission of voice data, display data, etc.

The antenna 701 transmits/receives electromagnetic wave signals between base stations for performing radio-based communication, such as the various forms of cellular telephone communication. The wireless communication processing circuitry 702 controls the communication performed between the user device 700 and other external devices such as the server 200 via the antenna 701. The wireless communication processing circuitry 702 may control communication between base stations for cellular phone communication.

The speaker 704 emits an audio signal corresponding to audio data supplied from the voice processing circuitry 703. The microphone 705 detects surrounding audio and converts the detected audio into an audio signal. The audio signal may then be output to the voice processing circuitry 703 for further processing. The voice processing circuitry 703 demodulates and/or decodes the audio data read from the memory 750 or audio data received by the wireless communication processing circuitry 702 and/or a short-distance wireless communication processing circuitry 707. Additionally, the voice processing circuitry 703 may decode audio signals obtained by the microphone 705.

The exemplary user device 700 may also include a display 300, a touch panel 730, an operation key 740, and a short-distance communication processing circuitry 707 connected to an antenna 706. The display 300 may be a Liquid Crystal Display (LCD), an organic electroluminescence display panel, or another display screen technology.

The touch panel 730 may include a physical touch panel display screen and a touch panel driver. The touch panel 730 may include one or more touch sensors for detecting an input operation on an operation surface of the touch panel display screen.

For simplicity, the present disclosure assumes the touch panel 730 is a capacitance-type touch panel technology. However, it should be appreciated that aspects of the present disclosure may easily be applied to other touch panel types (e.g., resistance-type touch panels) with alternate structures. In certain aspects of the present disclosure, the touch panel 730 may include transparent electrode touch sensors arranged in the X-Y direction on the surface of transparent sensor glass.

The operation key 740 may include one or more buttons or similar external control elements, which may generate an operation signal based on a detected input by the user. In addition to outputs from the touch panel 730, these operation signals may be supplied to the controller 710 for performing related processing and control. In certain aspects of the present disclosure, the processing and/or functions associated with external buttons and the like may be performed by the controller 710 in response to an input operation on the touch panel 730 display screens rather than the external button, key, etc. In this way, external buttons on the user device 700 may be eliminated in lieu of performing inputs via touch operations, thereby improving water-tightness.

The antenna 706 may transmit/receive electromagnetic wave signals to/from other external apparatuses, and the short-distance wireless communication processing circuitry 707 may control the wireless communication performed between the other external apparatuses. Bluetooth, IEEE 802.11, and near-field communication (NFC) are non-limiting examples of wireless communication protocols that may be used for inter-device communication via the short-distance wireless communication processing circuitry 707.

The user device 700 may include camera 709, which includes a lens and shutter for capturing photographs of the surroundings around the user device 700. In an embodiment, the camera 709 captures surroundings of an opposite side of the user device 700 from the user. The images of the captured photographs can be displayed on the display panel 300. Memory circuitry saves the captured photographs. The memory circuitry may reside within the camera 709 or it may be part of the memory 750. The camera 709 can be a separate feature attached to the user device 700 or it can be a built-in camera feature.

The user device 700 can include an application that requests data processing from the server 200 via the network 620.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The various elements, features, and processes described herein may be used independently of one another, or may be combined in various ways. All possible combinations and subcombinations are intended to fall within the scope of this disclosure.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosure. The accompanying claims and their equivalents are intended to cover such forms or modifications as would fall within the scope and spirit of the present disclosure. For example, this technology may be structured for cloud computing whereby a single function is shared and processed in collaboration among a plurality of apparatuses via a network.

According to an embodiment of the present disclosure, there is provided an apparatus. The apparatus includes processing circuitry configured to extract a textual content included within a digital document, perform a text search using the extracted textual content on an indexed master document database to identify one or more master documents that are similar, within a pre-determined threshold, to the digital document, generate a candidate master document list using the one or more master documents identified based on the text search, extract a plurality of features of the digital document, perform a comparison, after performing the text search, of the plurality of features of the digital document with features of the one or more master documents in the candidate master document, and identify a master document of the one or more master documents that matches the digital document based on the comparison of the features.

In one embodiment, the processing circuitry is further configured to rank the one or more master document in the candidate master document list, align the digital document with the identified master document having a highest rank, and extract data from the digital document including typed and handwritten text. In one embodiment, the processing circuitry is further configured to determine a location of the textual content within the digital document, and perform the text search using the textual content specific to the location on the indexed master document database to identify one or more master documents having similar textual content at the location.

In one embodiment, the location is a section within the digital document. In one embodiment, the location is a Cartesian coordinate within the digital document.

In one embodiment, the processing circuitry performs the comparison by first converting the plurality of features to a text format and using the plurality of features in the text format to compare with features in a text format of the one or more master documents in the candidate master document.

Furthermore, according to an embodiment of the present disclosure, there is provided a method. The method includes extracting, via processing circuitry, a textual content included within a digital document, performing, via the processing circuitry, a text search using the extracted textual content on an indexed master document database to identify one or more master documents that are similar, within a pre-determined threshold, to the digital document, generating, via the processing circuitry, a candidate master document list using the one or more master documents identified based on the text search, extracting, via the processing circuitry, a plurality of features of the digital document, performing, via the processing circuitry, a comparison, after performing the text search, of the plurality of features of the digital document with features of the one or more master documents in the candidate master document list, and identifying, via the processing circuitry, a master document of the one or more master documents that matches the digital document based on the comparison of the features.

In one embodiment. the method further includes ranking, via the processing circuitry, the one or more master document in the candidate master document list, aligning, via the processing circuitry, the digital document with the identified master document having a highest rank, and extracting, via the processing circuitry, data from the digital document including typed and handwritten text. In one embodiment, the method further includes determining, via the processing circuitry, a location of the textual content within the digital document, and performing, via the processing circuitry, the text search using the textual content specific to the location on the indexed master document database to identify one or more master documents having similar textual content at the location.

In one embodiment, the location is a section within the digital document. In one embodiment, the location is a Cartesian coordinate within the digital document.

In one embodiment, the performing of the comparison includes first converting the plurality of features to a text format and using the plurality of features in the text format to compare with features in a text format of the one or more master documents in the candidate master document.

Furthermore, according to an embodiment of the present disclosure, there is provided a non-transitory computer-readable medium storing instructions which when executed by a computer, cause the computer to perform a method. The method includes extracting a textual content included within a digital document, performing a text search using the extracted textual content on an indexed master document database to identify one or more master documents that are similar, within a pre-determined threshold, to the digital document, generating a candidate master document list using the one or more master documents identified based on the text search, extracting a plurality of features of the digital document, performing a comparison after performing the text search, of the plurality of features of the digital document with features of the one or more master documents in the candidate master document list, and identifying a master document of the one or more master documents that matches the digital document based on the comparison of the features.

In one embodiment, the non-transitory computer-readable medium further includes ranking the one or more master document in the candidate master document list, aligning the digital document with the identified master document having a highest rank, and extracting data from the digital document including typed and handwritten text. In one embodiment, the non-transitory computer-readable medium further includes determining a location of the textual content within the digital document, and performing the text search using the textual content specific to the location on the indexed master document database to identify one or more master documents having similar textual content at the location.

In one embodiment, the location is a section within the digital document. In one embodiment, the location is a Cartesian coordinate within the digital document.

In one embodiment, the performing of the comparison includes first converting the plurality of features to a text format and using the plurality of features in the text format to compare with features in a text format of the one or more master documents in the candidate master document.

The invention claimed is:

1. An apparatus comprising:
processing circuitry configured to
extract a plurality of features of a digital document, after performing a text search using extracted textual content from the digital document or using extracted non-textual content that is converted to a text format from the digital document, to identify one or more master documents that are similar, within a threshold, to the digital document,
perform, after performing the text search using the extracted textual content or the extracted non-textual content and after performing the extracting of the plurality of features, a comparison of the plurality of features of the digital document with features of the one or more master documents, and
identify, after performing the text search using the extracted textual content or the extracted non-textual content and after performing the comparison, a master document of the one or more master documents that matches the digital document based on the comparison of the features.

2. The apparatus of claim 1, wherein the processing circuitry is further configured to
align the digital document with the identified master document, and
extract data from the digital document including typed and handwritten text.

3. The apparatus of claim 1, wherein after determining a location of the textual content within the digital document, the text search is performed using the textual content to identify one or more master documents having similar textual content at the location or any other location of the one or more master documents.

4. The apparatus of claim 3, wherein the location is a section within the digital document.

5. The apparatus of claim 3, wherein the location is a Cartesian coordinate within the digital document.

6. The apparatus of claim 1, wherein the processing circuitry performs the comparison by first converting the plurality of features to a format similar to a format of the one or more master documents and using the plurality of features in the format to compare with features in the format of the one or more master documents.

7. A method comprising:
extracting, via processing circuitry, a plurality of features of a digital document, after performing a text search using extracted textual content from the digital document or using extracted non-textual content that is converted to a text format from the digital document, to identify one or more master documents that are similar, within a threshold, to the digital document;

performing, via the processing circuitry, after performing the text search using the extracted textual content or the extracted non-textual content and after performing the extracting of the plurality of features, a comparison of the plurality of features of the digital document with features of the one or more master documents; and identifying, via the processing circuitry, after performing the text search using the extracted textual content or the extracted non-textual content and after performing the comparison, a master document of the one or more master documents that matches the digital document based on the comparison of the features.

8. The method of claim 7, further comprising:

aligning, via the processing circuitry, the digital document with the identified master document; and extracting, via the processing circuitry, data from the digital document including typed and handwritten text.

9. The method of claim 7, wherein after determining a location of the textual content within the digital document, the text search is performed using the textual content to identify one or more master documents having similar textual content at the location or any other location of the one or more master documents.

10. The method of claim 9, wherein the location is a section within the digital document.

11. The method of claim 9, wherein the location is a Cartesian coordinate within the digital document.

12. The method of claim 7, wherein the performing of the comparison includes first converting the plurality of features to a format similar to a format of the one or more master documents and using the plurality of features in the format to compare with features in the format of the one or more master documents.

13. A non-transitory computer-readable medium storing instructions which when executed by a computer, cause the computer to perform a method, the method comprising:

extracting a plurality of features of a digital document, after performing a text search using extracted textual content from the digital document or using extracted non-textual content that is converted to a text format from the digital document, to identify one or more master documents that are similar, within a threshold, to the digital document;

performing, after performing the text search using the extracted textual content or the extracted non-textual content and after performing the extracting of the plurality of features, a comparison of the plurality of features of the digital document with features of the one or more master documents; and identifying, after performing the text search using the extracted textual content or the extracted non-textual content and after performing the comparison, a master document of the one or more master documents that matches the digital document based on the comparison of the features.

14. The non-transitory computer-readable medium of claim 13, further comprising:

aligning the digital document with the identified master document; and extracting data from the digital document including typed and handwritten text.

15. The non-transitory computer-readable medium of claim 13, wherein after determining a location of the textual content within the digital document, the text search is performed using the textual content to identify one or more master documents having similar textual content at the location or any other location of the one or more master documents.

16. The non-transitory computer-readable medium of claim 15, wherein the location is a section within the digital document.

17. The non-transitory computer-readable medium of claim 15, wherein the location is a Cartesian coordinate within the digital document.

18. The non-transitory computer-readable medium of claim 13, wherein the performing of the comparison includes first converting the plurality of features to a format similar to a format of the one or more master documents and using the plurality of features in the format to compare with features in the format of the one or more master documents.

* * * * *